United States Patent [19]
Leitner

[11] Patent Number: 5,462,302
[45] Date of Patent: Oct. 31, 1995

[54] DOUBLE SWINGARM FRONT SUSPENSION FOR BICYCLES AND MOTORCYCLES

[76] Inventor: Horst Leitner, 429 Aster St., Laguna Beach, Calif. 92651

[21] Appl. No.: 142,837

[22] Filed: Oct. 25, 1993

Related U.S. Application Data

[63] Continuation of Ser. No. 782,614, Oct. 25, 1991, abandoned.

[51] Int. Cl.⁶ .................................................. B62K 21/02
[52] U.S. Cl. ........................ 280/277; 280/276; 280/279; 267/202
[58] Field of Search ................................ 280/275, 276, 280/277, 279, 283, 286, 697, 716; 267/201, 202, 257, 33, 152

[56] References Cited

U.S. PATENT DOCUMENTS

| | | | |
|---|---|---|---|
| 913,961 | 3/1909 | Levedahl | 280/276 |
| 4,212,481 | 7/1980 | Ribi | 280/276 |
| 4,690,428 | 9/1987 | Fluegge | 280/697 |

FOREIGN PATENT DOCUMENTS

| | | | |
|---|---|---|---|
| 0005599 | 5/1906 | France | 280/277 |
| 0376759 | 8/1907 | France | 280/277 |
| 1082316 | 12/1954 | France | 280/276 |
| 0837652 | 3/1952 | Germany | 280/277 |
| 1084599 | 6/1960 | Germany | 280/277 |
| 0001898 | 2/1899 | United Kingdom | 280/277 |
| 0008899 | 7/1911 | United Kingdom | 280/277 |

*Primary Examiner*—Anne Marie Boehler
*Attorney, Agent, or Firm*—Knobbe, Martens, Olson & Bear

[57] ABSTRACT

A suspension system for the front wheel of a bicycle or motorcycle, which has a minimum amount of friction. The suspension system includes an upper and a lower swingarm, with a spring and elastomer combination, which works as a friction damper on the inside coils on the spring. The relative angle and length of the swingarm to one another, permits the linear movement of the wheel on impact, to optimize suspension performance. The invention also desirably incorporates various elements which provide for the structural rigidity of the suspension assembly and light weight. In particular, the design preferably incorporates standard bicycle or motorcycle components. For example such components may include wheels, brakes, axles and steering components.

12 Claims, 2 Drawing Sheets

DOUBLE SWINGARM FRONT SUSPENSION FOR BICYCLES AND MOTORCYCLES

This application is a continuation of application Ser. No. 07/782,614, filed Oct. 25, 1991, now abandoned.

BACKGROUND OF THE INVENTION

1. Field of the Invention

The present invention relates to a front suspension, which is very lightweight and adds to the rider's comfort and safety. Most front suspensions today are telescopic types. This type of suspension, because of seals and linear bushings, have a great breakaway moment and therefore move only on bigger impacts, especially when the ratio of unsprung to sprung weight, in particular on a bicycle, is minimal, they have minimal lateral and torsional rigidity, because of long unsupported tubes.

2. Prior Art

Linkage parallel front suspension have been known on motorcycles for approximately 60 years. But since the linkage shock absorber and spring was mounted on top and bottom of the steering head bearing, they where complicated, heavy, and because most of the weight was in front of the steering axes, creating a pendular effect and a high center of gravity. Since the pivot points are high up, the stability is very much affected. There are also designs commonly known as leading link suspensions, where the wheel connects directly to the link or swingarm which describes a radius and therefore has a drastic trail change during movement which affects the stability.

No device is known where both links mount below the bottom steering bearing and the lower arm activates the spring and that the two arms are of different length and angles to each other so the rotational movement turns into a straight line of suspension deflection.

SUMMARY OF THE INVENTION

A suspension system for the front wheel of a bicycle or motorcycle, which has a minimum amount of friction. The suspension system includes an upper and a lower swingarm, with a spring and elastomer combination, which works as a friction damper on the inside coils on the spring. The relative angle and length of the swingarms to one another, permits the linear movement of the wheel on impact, to optimize suspension performance.

The invention also desirably incorporates various elements which provide for the structural rigidity of the suspension assembly and light weight. In particular, the design preferably incorporates standard bicycle or motorcycle components. For example such components may include wheels, brakes, axles and steering components.

The principle object of the present invention is to provide a suspension device, which has rigidity, minimum amount of friction and constant trail when in motion and linear deflection.

It is also an object of the present invention to provide such a device which is of simple, inexpensive construction and fits in a basic commonly used frame design.

Another object is to provide such a device which is lightweight, without sacrificing rigidity.

A further object is little or no maintenance, with self lubricating bearings, with pressed in pins instead of thread studs or bolts, to avoid loosening in long term use.

The foregoing objects can be accomplished by pressing or clamping the steer tube into the linkage swingarm support member, mounting top and lower arm with mounting pins with maintenance-free self lubricating bearings. The front end of the arms are pivotably connected to the fork which secures and retains the axle of the front wheel. The fork is similar to a standard rigid fork design. When the suspension is compressed, the fork moves in a generally linear direction. A spring is desirably connected to the lower arm with a swivel preload adjusting bolt. An elastomer plug is desirably positioned within the spring, to bias the mechanism to a non-compressed position and to provide a bottoming out bumper. In addition, the plug provides friction damping on the inside of the spring, so that no additional damping is required. On the other hand, the system may alternatively, or in addition, incorporate a hydraulic telescopic dampener. This dampener can be connected between the rear of the lower arm and the front of the upper arm.

DESCRIPTION OF THE PREFERRED EMBODIMENT

Figure 1:
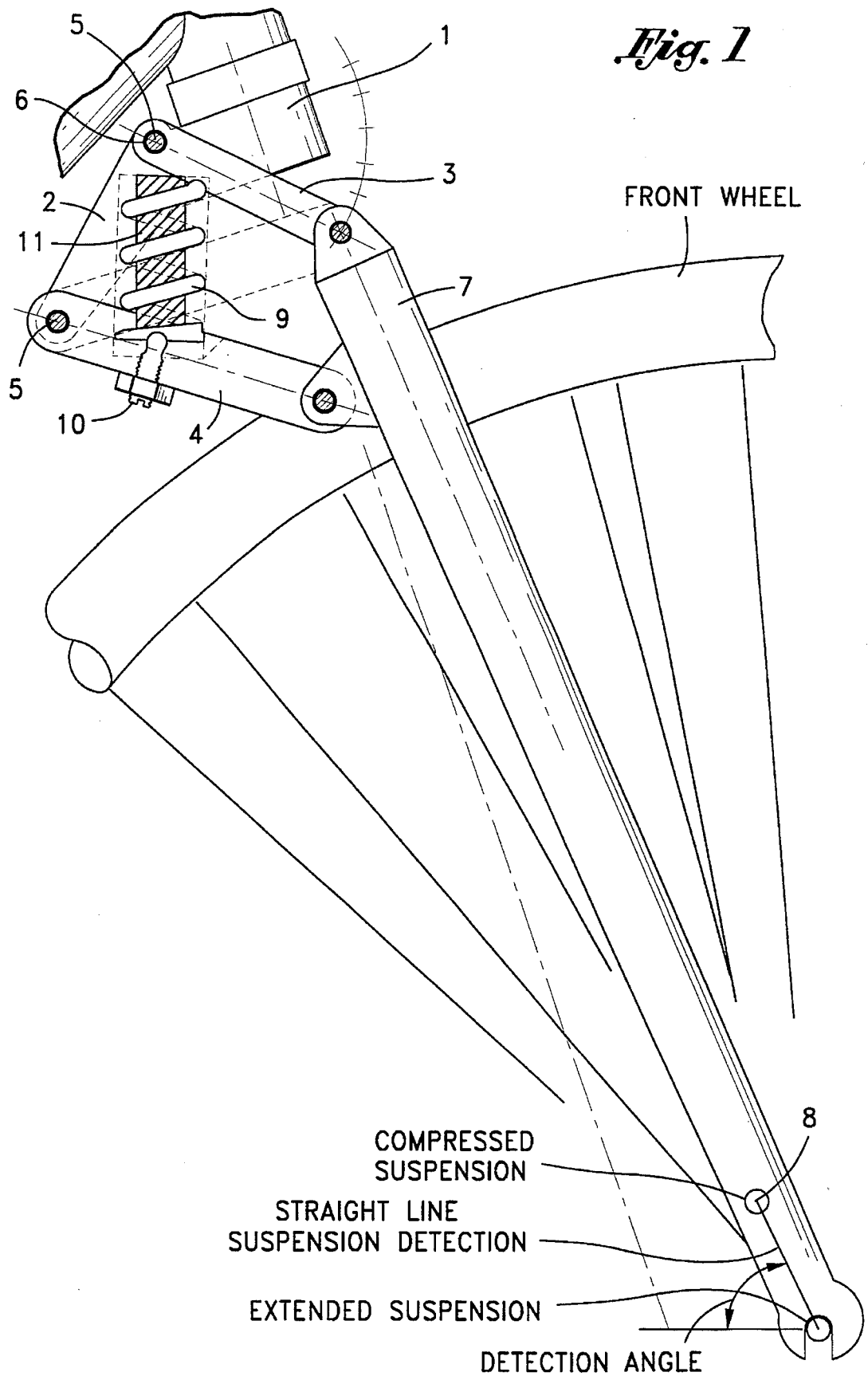
FIG. 1 is a left side elevational view of a suspension system embodying the invention in a noncompressed position, with the compressed position of the system shown in phantom.
Figure 2:
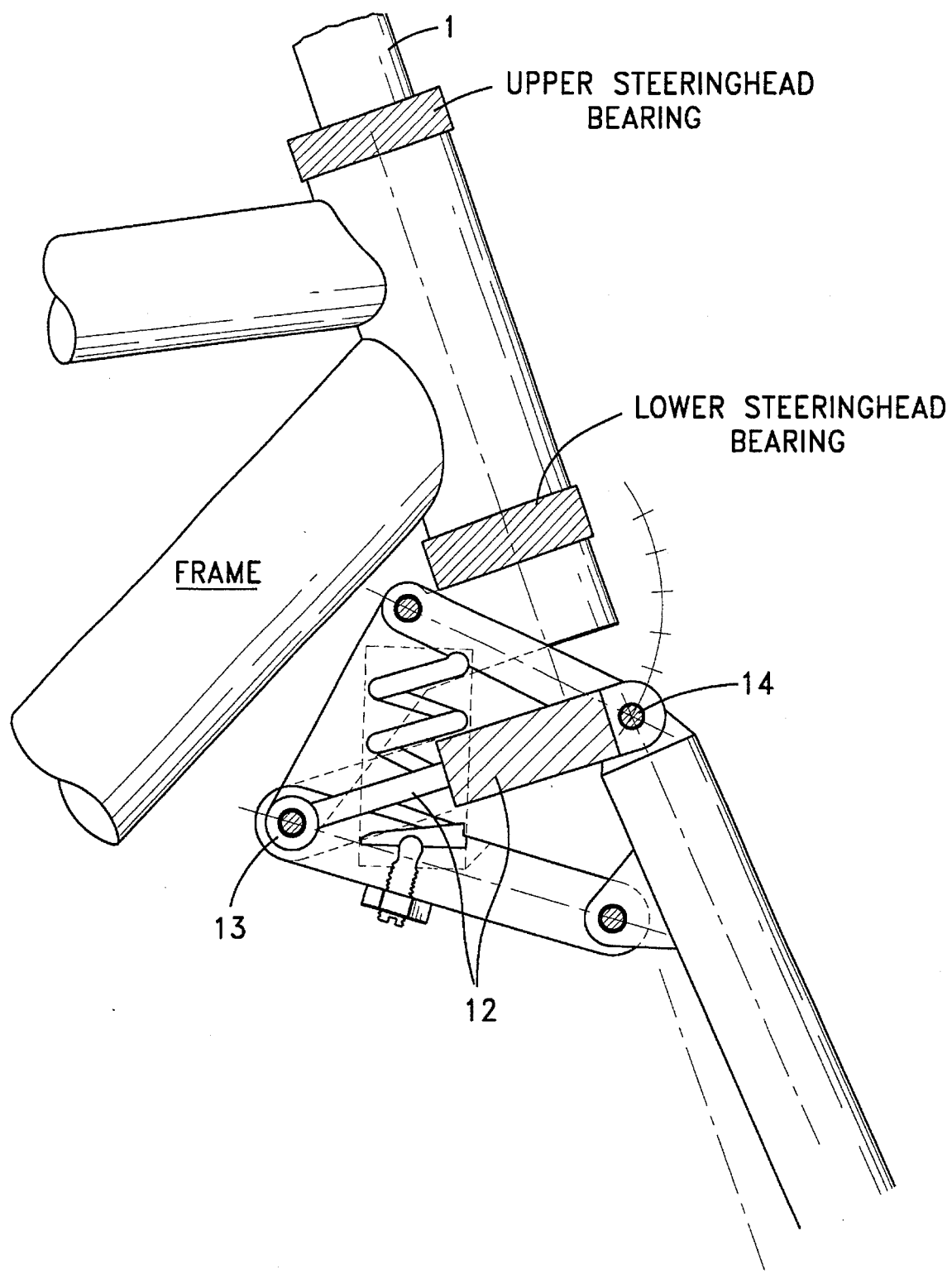
FIG. 2 is a left side elevational view of an alternative embodiment of the suspension system of FIG. 1.

The foregoing objects can be accomplished by pressing or clamping the steering tube 1 into the linkage swingarm support member 2, mounting top arm 3 and lower arm 4 with mounting pins 5 with maintenance-free self lubricating bearings 6. The front end of the arms 3,4 are pivotably connected to the fork 7 which secures and retains the axle 8 of the front wheel. The fork 7 is similar to a standard rigid fork design. When the suspension is compressed, the fork 7 moves in a generally linear direction. A spring 9 is desirably connected to the lower arm 4 with a swivel preload adjusting bolt 10. An elastomar plug 11 is desirably positioned within the spring 9, to bias the mechanism to a non-compressed position and to provide a bottoming out bumper. In addition, the plug 11 provides friction damping on the inside of the spring 9, so that no additional damping is required. On the other hand, the system may alternatively, or in addition, incorporate a hydraulic telescopic dampener 12. This dampener can be connected between the rear of the lower arm 13 and the front of the upper arm 14.

Desirably, the arms of the suspension are mounted behind and below the lower steering bearing. The top arm is of a different length than the lower arm and is angled with respect thereto so that the fork 7 and the wheel secured thereto moves in a substantially linear manner. The included angle the fork 7 forms with the road (i.e., the deflection angle) should be greater for off-road use than for on-road use.

The lower swingarm provides substantial structural rigidity, especially in the lateral direction. Advantageously, the swingarm support member receives one end of the spring in a recess, thereby providing a seat for the spring and elastomer plug. Desirably, the amount of preload is adjusted by means of a swivel mount to adjust for different compressive forces and ride heights.

I claim:

1. A suspension system for a bicycle having a frame, a steering shaft defining a steering axis secured to and pivotable relative to said frame, and a front wheel defining an axle, comprising:

a support member secured to said steering shaft;

a fork defining a pair of generally straight parallel fork arms having an upper end and a bottom end, each of said pair of fork arms defining an axis, said bottom end of said fork retaining said axle of said front wheel;

a top arm pivotably secured to said support member proximate said steering shaft and pivotably secured to said upper end of said fork;

a lower arm comprising a single piece straddling said front wheel, said lower arm pivotably secured to and straddling said support member distal said top arm from said steering shaft, and pivotally secured to said upper end of said fork at a position spaced toward said bottom end of said fork from said top arm;

means for resisting movement of said lower arm toward said steering shaft, wherein said top arm and said lower arm have different lengths and are nonparallel with respect to one another such that said bottom end of said fork arms moves linearly in response to impact transmitted through said front wheel.

2. The suspension system of claim 1, wherein said upper arm is shorter than said lower arm and said linear movement of said bottom end of said fork arms is generally parallel to said steering axis.

3. The suspension system of claim 2, wherein said means for resisting comprises a spring secured between said support member and said bottom arm.

4. The suspension system of claim 3, further comprising a pre-load adjusting bolt extending through said lower arm and connected to said bottom end of said spring.

5. The suspension system of claim 4, further comprising a elastomer plug within said spring between said support member and said lower arm to act as a bottoming out bumper.

6. The suspension system of claim 2, wherein said means for resisting comprises an elongate hydraulic telescopic dampener connected at one end to said lower arm and at another end to said top arm.

7. A suspension system for a bicycle having a frame, a steering shaft defining a steering axis secured to and pivotable relative to said frame, and a front wheel defining an axle, comprising:

a support member secured to said steering shaft;

a fork defining a pair of generally parallel fork arms having an upper end and a bottom end, said bottom end of said fork retaining said axle of said front wheel;

a top arm, said top arm pivotably secured to said support member proximate said steering shaft and pivotably secured to said upper end of said fork;

a lower arm comprising a single piece having a top end pivotably secured to and straddling said support member distal said top arm from said steering shaft and a bottom end straddling said front wheel pivotally secured to said top end of said fork at a position spaced toward said bottom end of said fork from said top arm;

a biasing member secured between said support member and said lower arm, wherein said top arm and said lower arm have different lengths and are nonparallel with respect to one another such that said bottom end of said fork arms moves substantially linearly in response to impact transmitted through said front wheel and, when said suspension is fully compressed, said bottom end of said lower arm is positioned proximate said steering shaft.

8. The suspension system of claim 7, wherein said top arm is shorter than said lower arm, further comprising an elongate hydraulic telescopic dampener connected at one end to said lower arm and at another end to said upper arm.

9. A suspension system for a bicycle having a frame, a steering shaft defining a steering axis secured to and pivotable relative to said frame, and a front wheel defining an axle, comprising:

a fork defining a pair of generally parallel fork arms having an upper end and a bottom end, said bottom end of said fork retaining said axle of said front wheel;

a mechanism, comprising:

a support member secured to said steering shaft;

a top arm pivotably secured to said support member proximate said steering shaft and pivotably secured to said upper end of said fork;

a lower arm comprising a single piece having a top end pivotably secured to said support member distal said top arm from said steering shaft, said lower arm further defining a bottom end pivotably secured to said top end of said fork at a position spaced toward said bottom end of said fork from said top arm;

a biasing member secured between said support member and said lower arm, wherein said top arm and said lower arm have different lengths and are nonparallel with respect to one another such that said bottom end of said fork arm moves substantially linearly in response to impact transmitted through said front wheel, said mechanism is located below substantially the entire steering shaft and, when said suspension is fully uncompressed, substantially the entire mechanism is positioned above said wheel.

10. The suspension system of claim 9, further comprising an elongate hydraulic telescopic dampener connected at one end to said lower arm and at another end to one of said upper arm.

11. A suspension system for a bicycle having a frame, a steering shaft defining a steering axis secured to and pivotable relative to said frame, and a front wheel defining an axle, comprising:

a fork defining a pair of generally straight parallel fork arms having an upper end and a bottom end, each of said pair of fork arms defining an axis, said bottom end of said fork retaining said axle of said front wheel; a mechanism, comprising:

a support member secured to said steering shaft;

a top arm pivotably secured to said support member proximate said steering shaft and pivotably secured to said upper end of said fork;

a lower arm comprising a single piece pivotably secured to said support member distal said top arm from said steering shaft and pivotably secured to said upper end of said fork at a position spaced toward said bottom end of said fork from said top arm;

means for resisting movement of said lower arm toward said steering shaft, wherein said top arm and said lower arm have different lengths and are nonparallel with respect to one another such that said bottom end of said fork arms move substantially linearly in response to impact transmitted through said front wheel, said mechanism is located below substantially the entire steering shaft and, when said suspension is fully compressed, said bottom end of said lower arm is positioned proximate said steering shaft, and wherein further, when said suspension is fully uncompressed, substantially the entire mechanism is positioned above said wheel.

12. The suspension system of claim 11, where said lower arm straddles said front wheel.

* * * * *

UNITED STATES PATENT AND TRADEMARK OFFICE
CERTIFICATE OF CORRECTION

PATENT NO. : 5,462,302

DATED : October 31, 1995

INVENTOR(S) : Horst Leitner

It is certified that error appears in the above-indentified patent and that said Letters Patent is hereby corrected as shown below:

```
In the drawings, Sheet 1, Fig. 1:
change "SUSPENSION DETECTION" to --SUSPENSION DEFLECTION--
change "DETECTION ANGLE" to --DEFLECTION ANGLE--
```

Signed and Sealed this

First Day of October, 1996

Attest:

BRUCE LEHMAN

Attesting Officer

Commissioner of Patents and Trademarks